US012392634B2

(12) United States Patent
Lv et al.

(10) Patent No.: US 12,392,634 B2
(45) Date of Patent: Aug. 19, 2025

(54) VEHICLE POSITIONING METHOD AND SYSTEM FOR FIXED PARKING SCENARIO

(71) Applicant: NIO TECHNOLOGY (ANHUI) CO., LTD, Hefei (CN)

(72) Inventors: Xuejie Lv, Hefei (CN); Shiting Wang, Hefei (CN); Chengzuo Qi, Hefei (CN); Kai Zhang, Hefei (CN); Quansheng Duan, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 0 days.

(21) Appl. No.: 17/717,372

(22) Filed: Apr. 11, 2022

(65) Prior Publication Data

US 2022/0326036 A1 Oct. 13, 2022

(30) Foreign Application Priority Data

Apr. 12, 2021 (CN) .......................... 202110387403.6

(51) Int. Cl.
*G01C 21/36* (2006.01)
*G01C 21/00* (2006.01)
(52) U.S. Cl.
CPC ....... *G01C 21/3685* (2013.01); *G01C 21/367* (2013.01); *G01C 21/3896* (2020.08)
(58) Field of Classification Search
CPC .............. G01C 21/3685; G01C 21/367; G01C 21/3896
See application file for complete search history.

(56) References Cited

U.S. PATENT DOCUMENTS

2011/0221585 A1* 9/2011 Higuchi ............. G01C 21/3697
701/533
2019/0323843 A1* 10/2019 Yu ........................... G01S 17/89
(Continued)

FOREIGN PATENT DOCUMENTS

| CN | 104102007 A | * 10/2014 | ............. G01C 21/26 |
| CN | 104457734 | 3/2015 | |

(Continued)

OTHER PUBLICATIONS

English Translation of CN-104102007-A (Year: 2023).*

(Continued)

*Primary Examiner* — Erin M Piateski
*Assistant Examiner* — Gabriel Joseph Rene Lambert
(74) *Attorney, Agent, or Firm* — Sheridan Ross P.C.

(57) ABSTRACT

The invention relates to a vehicle positioning method and system for a fixed parking scenario. The method includes: a map obtaining step of obtaining, by a vehicle, a parking scenario map from a cloud according to a preset trigger condition; a first positioning step of obtaining first geographical position information of the vehicle based on a first marker in a fixed parking scenario, and matching the first geographic position information with the parking scenario map, so as to obtain a first vehicle pose of the vehicle in the parking scenario map; and a second positioning step of obtaining second geographical position information of the vehicle based on a second marker in the fixed parking scenario, and matching the second geographical position information with the parking scenario map, so as to obtain a second vehicle pose of the vehicle in the parking scenario map. According to the invention, planar and spatial positioning of the vehicle can be implemented, and accurate positioning and accurate navigation in a fixed parking scenario can be implemented.

9 Claims, 3 Drawing Sheets

(56) References Cited

U.S. PATENT DOCUMENTS

| | | | |
|---|---|---|---|
| 2019/0323844 A1* | 10/2019 | Yendluri | G01S 17/86 |
| 2019/0340783 A1* | 11/2019 | Chen | G06N 3/045 |
| 2019/0367012 A1* | 12/2019 | Matta | G05D 1/0246 |
| 2020/0175871 A1* | 6/2020 | Sakurada | G01C 21/3602 |
| 2020/0198622 A1* | 6/2020 | Tagawa | B60W 30/18027 |
| 2020/0298836 A1* | 9/2020 | Kim | G01C 21/1656 |
| 2020/0342042 A1* | 10/2020 | Doraiswamy | G06F 16/29 |
| 2020/0356582 A1* | 11/2020 | Cui | G05D 1/0253 |
| 2021/0107465 A1* | 4/2021 | Hiei | G08G 1/168 |
| 2021/0287350 A1* | 9/2021 | Li | G06V 10/462 |
| 2021/0300338 A1* | 9/2021 | Shimamoto | G08G 1/146 |
| 2021/0323538 A1* | 10/2021 | Takahashi | G08G 1/143 |
| 2022/0169240 A1* | 6/2022 | Ishinoda | B60Q 9/008 |
| 2022/0176945 A1* | 6/2022 | Takato | G08G 1/143 |
| 2022/0204039 A1* | 6/2022 | Kang | B60W 60/0016 |
| 2022/0234572 A1* | 7/2022 | Tsuruoka | G08G 1/14 |
| 2022/0297673 A1* | 9/2022 | Valsan | G06T 7/70 |

FOREIGN PATENT DOCUMENTS

| | | |
|---|---|---|
| CN | 109102714 | 12/2018 |
| CN | 111746401 | 10/2020 |
| EP | 3726498 | 10/2020 |
| WO | WO-2019114761 A1 * 6/2019 | G01C 21/26 |

OTHER PUBLICATIONS

English Translation of WO-2019114761-A1 (Year: 2023).*
Extended Search Report for European Patent Application No. 22164621.9, dated Sep. 9, 2022, 7 pages.
Official Action with Machine Translation for China Patent Application No. 202110387403.6, dated Mar. 14, 2025, 17 pages.
Official Action with Machine Translation for China Patent Application No. 202110387403.6, dated Sep. 13, 2024, 14 pages.
Official Action for European Patent Application No. 22164621.9, dated Jun. 23, 2025, 7 pages.

* cited by examiner

VEHICLE POSITIONING METHOD AND SYSTEM FOR FIXED PARKING SCENARIO

CROSS-REFERENCE TO RELATED APPLICATION

This application claims the benefit of China Patent Application No. 202110387403.6 filed on Apr. 12, 2021, the entire contents of which are incorporated herein by reference in its entirety.

TECHNICAL FIELD

The invention relates to vehicle control technologies, and in particular, to a vehicle positioning method for a fixed parking scenario and a vehicle positioning system for a fixed parking scenario.

BACKGROUND ART

Automatic parking refers to automatic parking of a vehicle into a parking space without manual control. For different automatic parking systems, different methods are generally used to detect objects around a vehicle, and the vehicle may detect other vehicles that have been parked, the size of a parking space, and the distance to the roadside, and then automatically drive into the parking space.

The above automatic parking is usually an automatic parking technology for common parking spaces. For some fixed scenarios, especially some scenarios in which two aspects, i.e., plane and space, should be considered, such as a battery swap station scenario (usually, a battery swap station may be higher than the road surface, and there will be a slope), a dock parking/boarding scenario (due to the height of a water level, a dock is usually not flush with the shore, and there will also be a slope), and some stereoscopic parking garages, no relevant automatic parking technology has been proposed.

SUMMARY OF THE INVENTION

In view of the above-mentioned problems, the invention is intended to propose a vehicle positioning method for a fixed parking scenario and a vehicle positioning system for a fixed parking scenario that can implement the combination of planar positioning and spatial positioning.

An aspect of the invention provides a vehicle positioning method for a fixed parking scenario. The method comprises:
a map obtaining step of obtaining, by a vehicle, a parking scenario map from a cloud according to a preset trigger condition;
a first positioning step of obtaining first geographical position information of the vehicle based on a first marker in a fixed parking scenario, and matching the first geographic position information with the parking scenario map, so as to obtain a first vehicle pose of the vehicle in the parking scenario map; and a second positioning step of obtaining second geographical position information of the vehicle based on a second marker in the fixed parking scenario, and matching the second geographical position information with the parking scenario map, so as to obtain a second vehicle pose of the vehicle in the parking scenario map.

Optionally, the first marker is a planar marker in the fixed parking scenario, and the second marker is a spatial marker in the fixed parking scenario.

Optionally, the first marker is an outdoor marker in the fixed parking scenario, and the second marker is an indoor marker in the fixed parking scenario.

Optionally, in the map obtaining step, the vehicle is triggered according to the preset trigger condition, to obtain parking scenario attribute information of the fixed parking scenario, and to obtain the parking scenario map of the fixed parking scenario from the cloud based on the parking scenario attribute information.

Optionally, the first marker comprises one or a combination of the following:
a positioning marker set on a ground side of the fixed parking scenario;
a positioning marker set on a peripheral side of the fixed parking scenario; and
a positioning marker set on an upper side of the fixed parking scenario; and
the second marker comprises one or a combination of the following:
a positioning marker set on a ground side of the fixed parking scenario;
a positioning marker set on a peripheral side of the fixed parking scenario; and
a positioning marker set on an upper side of the fixed parking scenario.

Optionally, in the second positioning step, the second geographical position information of the vehicle is obtained based on the spatial marker, and the second geographical position information is converted from spatial coordinates to planar coordinates through spatial mapping, for matching with the parking scenario map.

Optionally, the planar marker is one or a combination of the following:
an arrow-shaped marker;
a single-right-angle-shaped marker;
a triangle marker; and
a polygon marker.

Optionally, the spatial marker is one or a combination of the following:
a two-dimensional code marker;
an arrow-shaped marker;
a single-right-angle-shaped marker;
a triangle marker;
a polygon marker; and
objects that are originally set in the fixed parking scenario.

Optionally, the preset trigger condition comprises:
an active trigger condition that is triggered by a user actively; and/or
a passive trigger condition that is triggered by a vehicle action.

An aspect of the invention provides a vehicle positioning system for a fixed parking scenario. The system includes:
a map obtaining module configured to trigger the obtaining of a parking scenario map from a cloud according to a preset trigger condition;
a first positioning module configured to obtain first geographical position information of the vehicle based on a first marker in a fixed parking scenario, and match the first geographic position information with the parking scenario map, so as to obtain a first vehicle pose of the vehicle in the parking scenario map; and
a second positioning module configured to obtain second geographical position information of the vehicle based on a second marker in the fixed parking scenario, and match the second geographical position information with the parking scenario map, so as to obtain a second vehicle pose of the vehicle in the parking scenario map.

Optionally, the first positioning module is a planar positioning module for implementing planar positioning, the first marker is a planar marker in the fixed parking scenario, the second positioning module is a spatial positioning module for implementing spatial positioning, and the second marker is a spatial marker in the fixed parking scenario.

Optionally, the first positioning module is a positioning module for implementing outdoor positioning, the first marker is an outdoor marker in the fixed parking scenario, the second positioning module is a positioning module for implementing indoor positioning, and the second marker is an indoor marker in the fixed parking scenario.

Optionally, the map obtaining module is triggered according to the preset trigger condition, to obtain parking scenario attribute information of the fixed parking scenario, and to obtain the parking scenario map of the fixed parking scenario from the cloud based on the parking scenario attribute information.

Optionally, the first marker comprises one or a combination of the following:
- a positioning marker set on a ground side of the fixed parking scenario;
- a positioning marker set on a peripheral side of the fixed parking scenario; and
- a positioning marker set on an upper side of the fixed parking scenario; and the second marker comprises one or a combination of the following:
- a positioning marker set on a ground side of the fixed parking scenario;
- a positioning marker set on a peripheral side of the fixed parking scenario; and
- a positioning marker set on an upper side of the fixed parking scenario.

Optionally, the second positioning module obtains the second geographical position information of the vehicle based on the spatial marker, and converts the second geographical position information from spatial coordinates to planar coordinates through spatial mapping, for matching with the parking scenario map.

Optionally, the planar marker is one or a combination of the following:
- an arrow-shaped marker;
- a single-right-angle-shaped marker;
- a triangle marker; and
- a polygon marker.

Optionally, the spatial marker is one or a combination of the following:
- a two-dimensional code marker;
- an arrow-shaped marker;
- a single-right-angle-shaped marker;
- a triangle marker;
- a polygon marker; and
- objects that are originally set in the fixed parking scenario.

An aspect of the invention provides a vehicle, which includes the vehicle positioning system for a fixed parking scenario.

An aspect of the invention provides a computer-readable medium having a computer program stored thereon, where when the computer program is executed by a processor, the vehicle positioning method for a fixed parking scenario is implemented.

An aspect of the invention provides a computer device, which includes a storage module, a processor, and a computer program stored on the storage module and executable on the processor, where the processor implements the vehicle positioning method for a fixed parking scenario when executing the computer program.

As described above, the vehicle positioning method for a fixed parking scenario and the vehicle positioning system for a fixed parking scenario according to the invention can not only provide positioning in terms of plane (on the ground), and can also provide positioning in terms of space, thereby meeting requirements of stereo parking in a fixed parking scenario including different planes by planning a first navigation path corresponding to the plane and a second navigation path corresponding to the space. In addition, since the latest and most accurate parking scenario map can be obtained from the cloud in real time, high-accuracy map matching can be implemented to provide a more accurate parking path.

The vehicle positioning method for a fixed parking scenario and the vehicle positioning system for a fixed parking scenario of the invention can be applied to various scenarios in which planar positioning and spatial positioning need to be combined, that is, scenarios including slopes.

DETAILED DESCRIPTION OF EMBODIMENTS

Some of the embodiments of the invention are described below and are intended to provide a basic understanding of the invention. They are not intended to confirm key or decisive elements of the invention or limit the scope of protection.

For concise and illustrative purposes, this specification mainly describes the principles of the invention with reference to its exemplary embodiments. However, those skilled in the art will readily recognize that the same principles can be equivalently applied to all types of vehicle positioning methods for a fixed parking scenario and vehicle positioning systems for a fixed parking scenario, and the same principles can be implemented therein. Any such changes do not depart from the true spirit and scope of this patent application.

In addition, in the following description, reference is made to the accompanying drawings, which illustrate specific exemplary embodiments. Electrical, mechanical, logical, and structural changes can be made to these embodiments without departing from the spirit and scope of the invention. Furthermore, although the features of the invention are disclosed in combination with only one of several implementations/embodiments, if any given or recognizable function may be desired and/or advantageous, this feature can be combined with one or more other features of other implementations/embodiments. Therefore, the following description should not be considered in a limiting sense, and the scope of the invention is defined by the appended claims and their equivalents.

The terms such as "have" and "comprise" indicate that in addition to the units (modules) and steps that are directly and clearly described in the specification and the claims, other units (modules) and steps that are not directly or clearly described are not excluded in the technical solutions of the invention.

Figure 1:
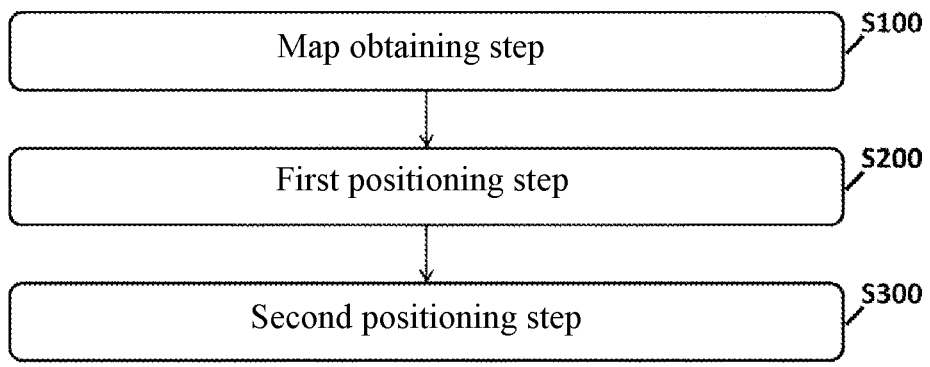
FIG. 1 is a schematic flowchart representing a vehicle positioning method for a fixed parking scenario of the invention.

FIG. 1 is a schematic flowchart of a vehicle positioning method for a fixed parking scenario of the invention.

As shown in FIG. 1, the vehicle positioning method for a fixed parking scenario of the invention includes the following steps:

- a map obtaining step S100: triggering a vehicle to obtain a parking scenario map from a cloud according to a preset trigger condition;
- a first positioning step S200: obtaining first geographical position information of the vehicle based on a first marker in a fixed parking scenario, and matching the first geographic position information with the parking scenario map, so as to obtain a first vehicle pose of the vehicle in the parking scenario map; and
- a second positioning step S300: obtaining second geographical position information of the vehicle based on a second marker in the fixed parking scenario, and matching the second geographical position information with the parking scenario map, so as to obtain a second vehicle pose of the vehicle in the parking scenario map.

In the map obtaining step S100, triggering is performed according to the preset trigger condition, to obtain parking scenario attribute information of the fixed parking scenario, and to obtain the parking scenario map of the fixed parking scenario from the cloud based on the parking scenario attribute information. The purpose of setting the map obtaining step S100 is to obtain the latest and most accurate parking scenario map of the fixed parking scenario, such that a more accurate navigation path can be planned in the subsequent first positioning step S200 and second positioning step S300.

Here, the preset trigger condition includes: an active trigger condition that is triggered by a user actively; and/or a passive trigger condition that is triggered by a vehicle action. For example, the active trigger condition that is triggered by a user actively may indicate that the user initiates a request actively. Specifically, for example, the user sends an instruction to the vehicle through an operation on a mobile phone, and the vehicle initiates, to the cloud, a request for obtaining the parking scenario map according to the instruction. The passive trigger condition that is triggered by a vehicle action may be based on a passive trigger condition set by a vehicle action. For example, when the vehicle reaches a fixed parking scenario, the vehicle is triggered to initiate, to the cloud, a request for obtaining the parking scenario map.

As an alternative to the map obtaining step S100, the following method can also be used. Due to a limitation on an amount of data transmitted by the cloud, a default parking scenario map can be designed, in the battery swap station, for loading at the beginning of a program, and only measured values that exceed a certain threshold due to construction errors are issued to update the parking scenario map. For example, by using a coordinate system separation design, the first marker uses one coordinate system during construction, and the second marker uses another coordinate system, and the cloud issues a displacement between the two coordinate systems.

As an implementation, the first marker is a planar marker in the fixed parking scenario, and the second marker is a spatial marker in the fixed parking scenario. In this way, in the first positioning step S200, the first geographical position information (planar position information) of the vehicle is obtained based on the planar marker, and matching between the first geographical position information and the parking scenario map is performed, so as to obtain, through calculation, the first vehicle pose (a planar pose) of the vehicle in the parking scenario map. In the second positioning module S300, the second geographical position information (spatial position information) of the vehicle is obtained based on the spatial marker, and matching between the second geographical position information and the parking scenario map is performed, so as to obtain the second vehicle pose (a spatial pose) of the vehicle in the parking scenario map.

Spatial positioning is implemented in the second positioning step S300, which specifically includes: obtaining the second geographical position information (i.e., spatial position information) of the vehicle based on the spatial marker, and converting the second geographical position information from spatial coordinates to planar coordinates through spatial mapping, for matching with the parking scenario map. As an example of conversion from the spatial coordinates to the planar coordinates, for example, a 6D pose (x, y, z, yaw, roll, pitch) is projected into a planar coordinate system (x, y, yaw). Yaw in the two coordinate systems does not refer to the same angle.

As another implementation, the first marker is an outdoor marker in the fixed parking scenario, and the second marker is an indoor marker in the fixed parking scenario. In this way, in the first positioning step S200, the first geographical position information (outdoor position information) of the vehicle is obtained based on the outdoor marker, and matching between the first geographical position information and the parking scenario map is performed, so as to obtain the first vehicle pose (an outdoor pose) of the vehicle in the parking scenario map. In the second positioning module S300, the second geographical position information (indoor position information) of the vehicle is obtained based on the indoor marker, and matching between the second geographical position information and the parking scenario map is performed, so as to obtain the second vehicle pose (an indoor pose) of the vehicle in the parking scenario map.

In addition, upon obtaining the first vehicle pose in the first positioning step S200, a first navigation path may be planned based on the first vehicle pose and a first target position, so as to navigate the vehicle to the first target position. Similarly, upon obtaining the second geographical position information in the second positioning step S300, a second navigation path may be planned based on the second vehicle pose and a second target position, so as to navigate the vehicle to the second target position.

Here, with regard to a position at which the planar marker is set, as an example, the planar marker may include one or a combination of the following: a positioning marker set on a ground side of the fixed parking scenario; a positioning marker set on a peripheral side of the fixed parking scenario; and a positioning marker set on an upper side of the fixed parking scenario.

With regard to a position at which the spatial marker is set, as an example, the spatial marker includes one or a combination of the following: a positioning marker set on a ground side of the fixed parking scenario; a positioning marker set on a peripheral side of the fixed parking scenario; and a positioning marker set on an upper side of the fixed parking scenario.

Next, with regard to the shape of the planar marker, the planar marker may be one or a combination of the following: an arrow-shaped marker; a single-right-angle-shaped marker; a triangle marker; and a polygon marker. With regard to the shape of the spatial marker, the spatial marker may be one or a combination of the following: a two-dimensional code marker; an arrow-shaped marker; a single-right-angle-shaped marker; a triangle marker; and a polygon marker.

Figure 2:
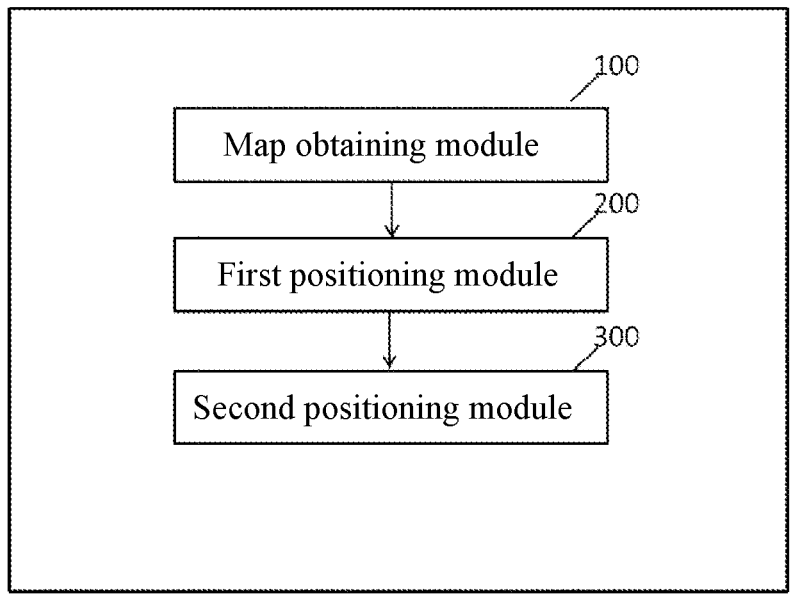
FIG. 2 is a structural block diagram representing a vehicle positioning system for a fixed parking scenario of the invention.

FIG. 2 is a structural block diagram of a vehicle positioning system for a fixed parking scenario of the invention.

As shown in FIG. 2, the vehicle positioning system for a fixed parking scenario of the invention includes:

- a map obtaining module 100 configured to trigger the obtaining of a parking scenario map from a cloud according to a preset trigger condition;
- a first positioning module 200 configured to obtain first geographical position information of the vehicle based on a first marker, and match the first geographic position information with the parking scenario map, so as to obtain a first vehicle pose of the vehicle in the parking scenario map; and
- a second positioning module 300 configured to obtain second geographical position information of the vehicle based on a second marker, and match the second geographical position information with the parking scenario map, so as to obtain a second vehicle pose of the vehicle in the parking scenario map.

The map obtaining module 100 is triggered according to the preset trigger condition, to obtain parking scenario attribute information of the fixed parking scenario, and to obtain the parking scenario map of the fixed parking scenario from the cloud based on the parking scenario attribute information.

The preset trigger condition based on which the obtaining of the parking scenario map from the cloud is triggered may be a trigger condition initiated by a driver manually, in which case, for example, the driver sends a request for downloading the parking scenario map from the cloud, or may be a trigger condition initiated automatically, in which case, for example, the vehicle automatically sends a request for downloading the parking scenario map from the cloud when the vehicle reaches an area of a specified distance near the fixed parking scenario.

As an implementation, the first positioning module 100 is a planar positioning module for implementing planar positioning, and the first marker is a planar marker in the fixed parking scenario. The second positioning module 200 is a spatial positioning module for implementing spatial positioning, and the second marker is a spatial marker in the fixed parking scenario. Implementing spatial positioning by the second positioning module 300 specially involves obtaining the second geographical position information (the spatial position information) of the vehicle based on the spatial marker, and converting the second geographical position information from spatial coordinates to planar coordinates through spatial mapping, for matching with the parking scenario map.

With regard to the positions at which the planar marker and the spatial marker are set, the planar marker includes one or a combination of the following: a positioning marker set on a ground side of the fixed parking scenario; a positioning marker set on a peripheral side of the fixed parking scenario; and a positioning marker set on an upper side of the fixed parking scenario. In addition, the spatial marker includes one or a combination of the following: a positioning marker set on a ground side of the fixed parking scenario; a positioning marker set on a peripheral side of the fixed parking scenario; and a positioning marker set on an upper side of the fixed parking scenario. With regard to the shapes of the planar marker and the spatial marker, the planar marker is one or a combination of the following: an arrow-shaped marker; a single-right-angle-shaped marker; a triangle marker; and a polygon marker. In addition, the spatial marker is one or a combination of the following: a two-dimensional code marker; an arrow-shaped marker; a single-right-angle-shaped marker; a triangle marker; a polygon marker; and objects that are originally set in the fixed parking scenario. The so-called "objects that are originally set in the fixed parking scenario" here refer to objects that are inherent in the fixed parking scenario (such as in the battery swap station) in addition to the additionally pasted markers, such as a front V-shaped groove, a rear planar groove, and a warning sticker to provide a warning to users.

As another implementation, the first positioning module 100 is an outdoor positioning module for implementing outdoor positioning, and the first marker is an outdoor marker in the fixed parking scenario. The second positioning module 200 is an indoor positioning module for implementing indoor positioning, and the second marker is an indoor marker in the fixed parking scenario.

As described above, the vehicle positioning method for a fixed parking scenario and the vehicle positioning system for a fixed parking scenario according to the invention can not only provide positioning in terms of plane (on the ground), and can also provide positioning in terms of space, and flexible positioning for a fixed parking scenario including different planes, thereby enabling more accurate parking navigation.

In addition, since the latest and most accurate parking scenario map can be obtained from the cloud in real time, high-accuracy map matching can be implemented to provide a more accurate parking path. Further, in the vehicle positioning method for a fixed parking scenario and the vehicle positioning system for a fixed parking scenario of the invention, setting the planar positioning marker and the spatial positioning marker provides planar and spatial positioning, and the two can be combined to provide a parking path with a certain degree of flexibility.

The vehicle positioning method for a fixed parking scenario and the vehicle positioning system for a fixed parking scenario of the invention can be applied to various scenarios in which planar positioning and spatial positioning need to be combined, that is, scenarios including slopes. As an example, the following scenarios are listed: a battery swap station scenario for an electric vehicle (usually, a battery swap station may be higher than the road surface, and there will be a slope when the battery swap station is above the road surface), a dock parking/boarding scenario (due to the size of the draft of a ship, a dock is usually not flush with the shore, and there will also be a slope), and some stereoscopic parking garages (which may include planes and slopes).

The vehicle positioning method for a fixed parking scenario and the vehicle positioning system for a fixed parking scenario of the invention are described below by taking a scenario in which an electric vehicle drives into a battery swap station as an embodiment.

Figure 3:
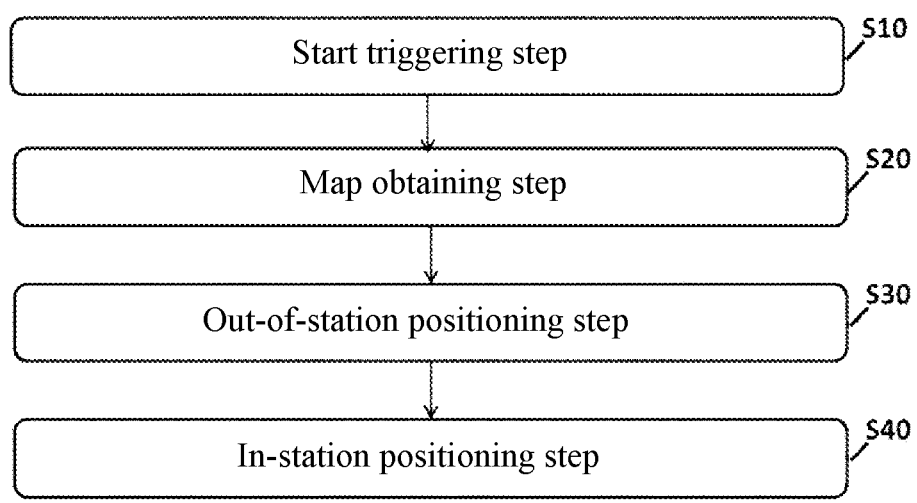
FIG. 3 is a schematic flowchart representing a vehicle positioning method in a battery swap station scenario.

FIG. 3 is a schematic flowchart representing a vehicle positioning method in a battery swap station scenario.

As shown in FIG. 3, the vehicle positioning method in a battery swap station scenario includes the following steps:

a start triggering step S10: a user driving an electric vehicle near a battery swap station, and enabling a battery swap service by, for example, placing an order on a mobile phone, which may trigger a map obtaining step S20 below;

the map obtaining step S20: obtaining a battery swap station map from a cloud;

an out-of-station positioning step S30: obtaining out-of-station geographical position information of the vehicle based on an out-of-station marker, and matching the out-of-station geographical position information with the battery swap station map, so as to obtain an out-of-station vehicle pose of the vehicle in the battery swap station map, for example, comparing an out-of-station geographical position feature point (that is, it can represent the position of the vehicle) represented by the out-of-station marker with a geographical position feature point in the battery swap station map, so as to determine the out-of-station vehicle pose of the vehicle in the battery swap station map; and an in-station positioning step S40: obtaining in-station geographical position information of the vehicle based on an in-station marker, and matching the in-station geographical position information with the battery swap station map, so as to obtain an in-station vehicle pose of the vehicle in the battery swap station map, for example, comparing an in-station geographical position feature point (that is, it can represent the position of the vehicle) represented by the in-station marker with a geographical position feature point in the battery swap station map, so as to determine the in-station vehicle pose of the vehicle in the battery swap station map.

In the map obtaining step S20, upon triggering of the start triggering step S10, attribute information, such as a battery swap station ID, of the battery swap station is obtained, and the battery swap station map of the battery swap station is obtained from the cloud based on the battery swap station ID. The purpose of setting the map obtaining step S20 is to obtain the latest and most accurate parking scenario map of the battery swap station, such that accurate positioning can be performed in the subsequent out-of-station positioning step S30 and in-station positioning step S40.

The out-of-station marker is a marker for out-of-station positioning, and the in-station marker is a marker for in-station positioning. In this way, in the out-of-station positioning step S30, the out-of-station geographical position information of the vehicle is obtained based on the out-of-station marker, and matching between the out-of-station geographical position information and the battery swap station map is performed, to calculate the out-of-station vehicle pose. In the in-station positioning step S40, the in-station geographical position information of the vehicle is obtained based on the in-station marker, and matching between the in-station geographical position information and the battery swap station map is performed, to calculate the in-station vehicle pose.

Here, with regard to a position at which the out-of-station marker is set, as an example, the out-of-station marker may include one or a combination of the following: a positioning marker set on a ground side of the battery swap station; a positioning marker set on a peripheral side of the battery swap station; and a positioning marker set on an upper side of the battery swap station. With regard to a position at which the in-station marker is set, as an example, the in-station marker may include one or a combination of the following: a positioning marker set on a ground side of the battery swap station; a positioning marker set on a peripheral side of the battery swap station; and a positioning marker set on an upper side of the battery swap station.

Next, with regard to the shape of the out-of-station marker, the out-of-station marker may be one or a combination of the following: an arrow-shaped marker; a single-right-angle-shaped marker; a triangle marker; and a polygon marker. With regard to the shape of the in-station marker, the in-station marker may be one or a combination of the following: a two-dimensional code marker; an arrow-shaped marker; a single-right-angle-shaped marker; a triangle marker; and a polygon marker.

Here, one example of the out-of-station marker and one example of the in-station marker are listed for explanation.

Figure 4:
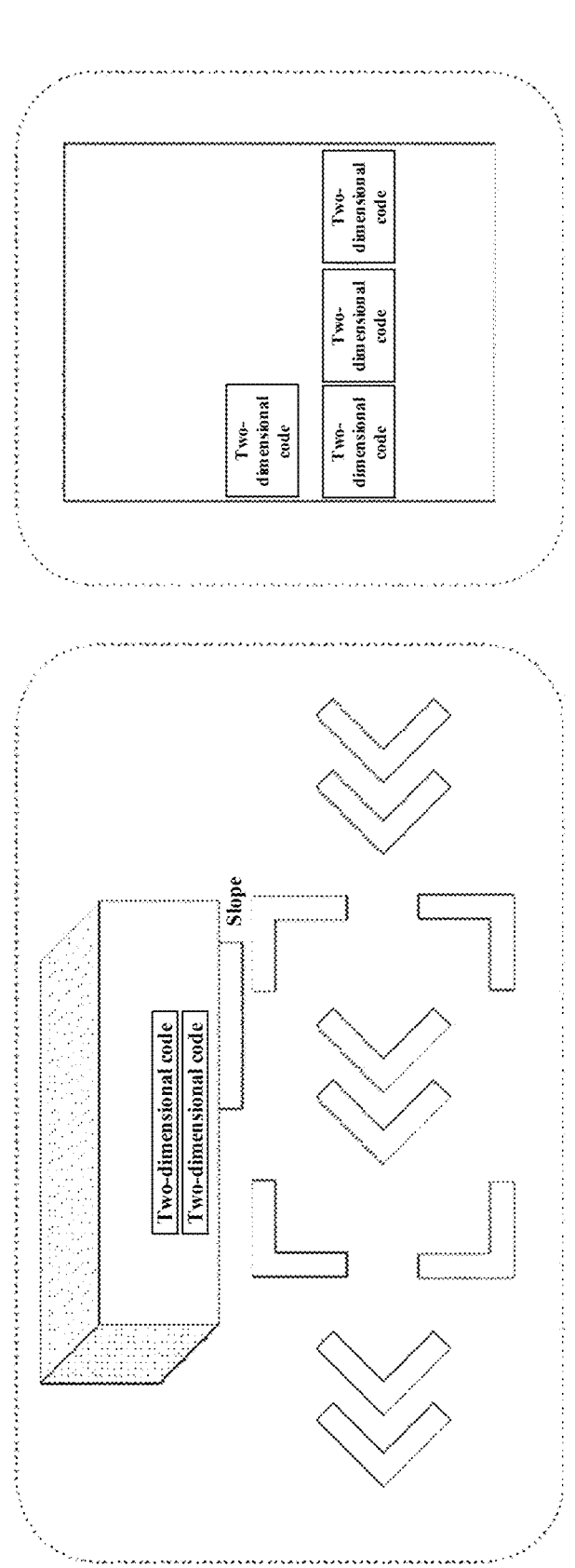
FIG. 4 is a schematic diagram representing one example of an out-of-station marker and one example of an in-station marker.

FIG. 4 is a schematic diagram representing one example of an out-of-station marker and one example of an in-station marker.

As shown in FIG. 4, the left-side figure represents a schematic diagram of markers set outside the battery swap station, and the right-side figure represents a schematic diagram of markers set inside the battery swap station.

Outside the battery swap station, as shown in the left-side figure, with regard to planar positioning, three pairs of arrow-shaped right-angled triangles are set on the ground, to provide positioning information and direction guidance for a user vehicle, and other four right-angled triangles form a parking space-shaped area to provide positioning information and user initial position guidance.

Figure 5:
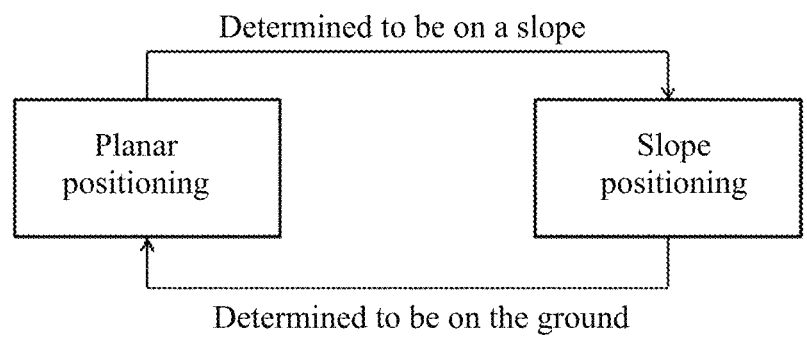
FIG. 5 is a schematic diagram representing mutual switching between planar positioning and slope positioning.

Then, with regard to spatial positioning, inside and outside the battery swap station, a total of six two-dimensional code marks (two two-dimensional code marks are set outside the battery swap station, and four two-dimensional code marks are set inside the battery swap station) are set on a wall, as shown in FIG. 4, to provide whole-process spatial positioning of the vehicle after the vehicle drives to a slope. In particular, spatial positioning of the battery swap station can be implemented, and through spatial mapping, spatial coordinates can be converted into planar coordinates to enable the subsequent calculation of a vehicle pose. In this way, the vehicle can be subjected to spatial positioning on the slope and inside the battery swap station by using the two-dimensional code marks, and subjected to planar positioning on the ground by using, for example, triangular ground marks, and switching can be performed between the planar positioning and the spatial positioning (such as slope positioning). FIG. 5 is a schematic diagram representing mutual switching between planar positioning and slope positioning. As shown in FIG. 5, if it is determined that the vehicle is on the ground after the vehicle goes up the slope, the planar positioning can be switched. If the vehicle then goes down the slope, it is determined that the vehicle is on the slope, and the slope positioning can be switched. Specifically, in the battery swap station, due to space constraints, the vehicle on a navigation path may first go up the slope from rear wheels (switching from the planar positioning to the slope positioning), then drive forward to go down the slope (switching from the slope positioning to the planar positioning), and then go back to go up the slope for entry (switching from the planar positioning to the slope positioning).

In the above content, double-headed arrows are listed with regard to planar positioning. In addition, a single right angle can also be used. Definitely, the basic element of the double-headed arrow itself is also a single right angle. The double-headed arrows can indicate correct heading of the vehicle to the user, and can also be distinguished from general road marks (big arrows, and straight lines) to avoid false initial positioning. Here, the arrows are preferably designed as the shape of triangle from an algorithmic perspective. As other variants, the shape of triangle can also be replaced with other shapes, such as a closed triangle, a square, and other regular shapes.

In addition, in the above content, a two-dimensional code is listed with regard to spatial positioning. As other variants, the two-dimensional code can be replaced with other regular shapes, such as a solid square and an equilateral triangle.

Figure 6:
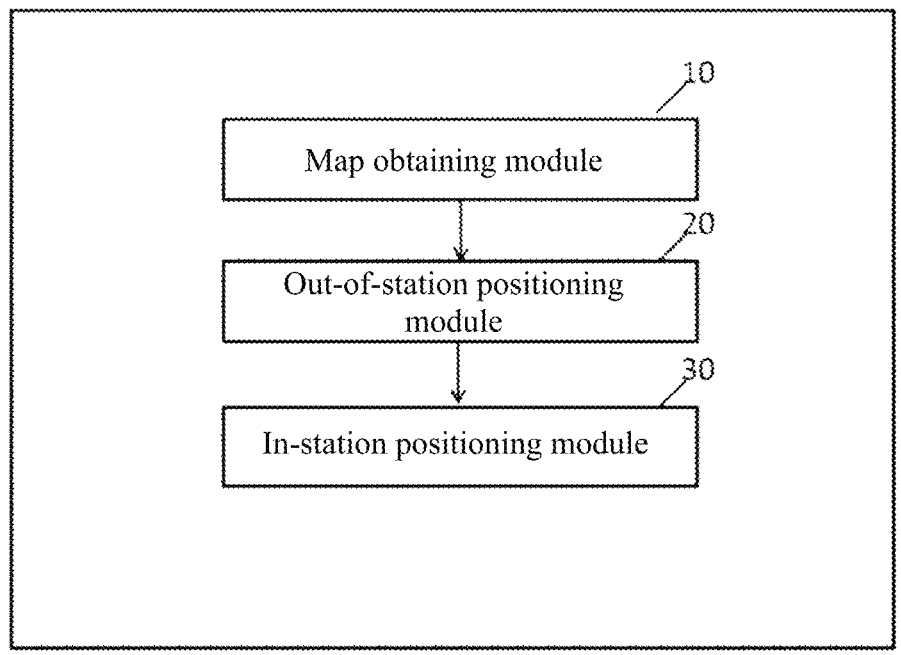
FIG. 6 is a structural block diagram representing a vehicle positioning system in a battery swap station scenario.

FIG. 6 is a structural block diagram representing a vehicle positioning system in a battery swap station scenario.

As shown in FIG. 6, the vehicle positioning system in a battery swap station scenario in this implementation includes:

- a map obtaining module 10 configured to trigger the obtaining of a battery swap station map from a cloud according to a preset trigger condition;
- an out-of-station positioning module 20 configured to obtain out-of-station geographical position information of a vehicle based on an out-of-station marker, and match the out-of-station geographical position information with the parking scenario map, so as to obtain an out-of-station vehicle pose of the vehicle in the battery swap station map; and
- an in-station positioning module 30 configured to obtain in-station geographical position information of the vehicle based on an in-station marker, and match the in-station geographical position information with the parking scenario map, so as to obtain an in-station vehicle pose of the vehicle in the battery swap station map.

The term "out-of-station" here refers to being outside the battery swap station, and the term "in-station" here refers to being inside the battery swap station.

The map obtaining module 10 is triggered according to the preset trigger condition, to obtain a battery swap station ID of the battery swap station, and to obtain the battery swap station map of the battery swap station from the cloud based on the battery swap station ID.

The preset trigger condition based on which the obtaining of the battery swap station map from the cloud is triggered may be a trigger condition initiated by a driver manually. For example, the driver sends a request for downloading the battery swap station map from the cloud. For example, the driver places an order of "battery swap service" on a mobile phone.

The out-of-station positioning module 20 is a positioning module for implementing out-of-station positioning, and the out-of-station marker is a marker for implementing out-of-station positioning (which may include a planar positioning marker and/or a spatial positioning marker). The in-station positioning module 30 is a positioning module for implementing out-of-station positioning, and the in-station marker is a marker for implementing out-of-station positioning (which may include a planar positioning marker and/or a spatial positioning marker).

As described above, the vehicle positioning method and the vehicle positioning system in a battery swap station scenario according to this implementation can not only provide positioning in terms of plane (on the ground), and can also provide positioning in terms of space, for example, the vehicle going up and down the slope. Setting the planar positioning marker and the spatial positioning marker provides planar and spatial positioning, and the two can be combined to provide a parking path with a certain degree of flexibility.

In addition, since the latest and most accurate battery swap station map can be obtained from the cloud in real time according to the vehicle positioning method and vehicle positioning system in a battery swap station scenario in this implementation, high-accuracy map matching can be implemented for more accurate vehicle positioning, thereby enabling more accurate parking navigation.

The invention further provides a computer-readable medium having a computer program stored thereon, where when the computer program is executed by a processor, the above-mentioned vehicle positioning method for a fixed parking scenario is implemented.

The invention further provides a computer device, which includes a storage module, a processor, and a computer program stored on the storage module and executable on the processor, where the processor implements the above-mentioned vehicle positioning method for a fixed parking scenario when executing the computer program.

The foregoing examples mainly describe the vehicle positioning method for a fixed parking scenario and the vehicle positioning system for a fixed parking scenario of the invention. Although only some of specific implementations of the invention are described, a person of ordinary skill in the art should understand that the invention may be implemented in multiple other forms without departing from the essence and scope of the invention. Accordingly, the presented examples and implementations are considered to be illustrative rather than restrictive, and the invention may encompass various modifications and replacements without departing from the spirit and scope of the invention that are defined by the appended claims.

The invention claimed is:

1. A vehicle positioning method for a parking lot with a fixed parking spot, the method comprising:
    a step of loading, by a processor, a parking scenario map;
    a step of receiving, by the processor, measured values that exceed a certain threshold due to construction errors from a cloud, wherein the measured values are in form of a displacement between a planar coordinate system for defining a position of a planar marker in the fixed parking spot and a spatial coordinate system for defining a position of a spatial marker in the fixed parking spot;
    a step of updating, by the processor, the parking scenario map with the measured values;
    a planar positioning step of:
        obtaining, by the processor, position information of a vehicle based on the planar marker in the fixed parking spot,
        matching, by the processor, the planar position information with the parking scenario map,
        obtaining, by the processor, a planar pose of the vehicle in the parking scenario map, and
        planning, by the processor, a first navigation path toward a first target position based on the planar pose and the first target position,
    the first navigation path corresponding to a plane; and
    a spatial positioning step of:
        obtaining, by the processor, spatial position information of the vehicle based on the spatial marker in the fixed parking spot,
        matching, by the processor, the spatial position information with the parking scenario map,
        obtaining, by the processor, a spatial pose of the vehicle in the parking scenario map, and
        planning, by the processor, a second navigation path toward a second target position based on the spatial pose and the second target position, the second navigation path corresponding to space.

2. The vehicle positioning method for a parking lot with a fixed parking spot according to claim 1, wherein
the planar marker is an outdoor marker in the fixed parking spot, and the spatial marker is an indoor marker in the fixed parking spot.

3. The vehicle positioning method for a parking lot with a fixed parking spot according to claim 1, wherein
in the step of receiving the measured values the vehicle is triggered, according to a preset trigger condition, to obtain parking scenario attribute information of the fixed parking spot and to obtain the parking scenario map of the fixed parking spot from the cloud based on the parking scenario attribute information,
wherein the parking scenario attribute information includes an ID for the parking lot.

4. The vehicle positioning method for a parking lot with a fixed parking spot according to claim 1, wherein
the planar marker comprises one or a combination of the following:
a positioning marker set on a ground side of the fixed parking spot;
a positioning marker set on a peripheral side of the fixed parking spot; and
a positioning marker set on an upper side of the fixed parking spot; and
the spatial marker comprises one or a combination of the following:
a positioning marker set on a ground side of the fixed parking spot;
a positioning marker set on a peripheral side of the fixed parking spot; and
a positioning marker set on an upper side of the fixed parking spot.

5. The vehicle positioning method for a parking lot with a fixed parking spot according to claim 1, wherein
in the spatial positioning step, the spatial position information is converted from the spatial coordinate system to the planar coordinate system through spatial mapping, for matching with the parking scenario map.

6. The vehicle positioning method for a parking lot with a fixed parking spot according to claim 1, wherein
the planar marker is one or a combination of the following:
an arrow-shaped marker;
a single-right-angle-shaped marker;
a triangle marker; and
a polygon marker.

7. The vehicle positioning method for a parking lot with a fixed parking spot according to claim 1, wherein
the spatial marker is one or a combination of the following:
a two-dimensional code marker;
an arrow-shaped marker;
a single-right-angle-shaped marker;
a triangle marker;
a polygon marker;
a front V-shaped groove;
a rear planar groove; and
a warning sticker.

8. The vehicle positioning method for a parking lot with a fixed parking spot according to claim 3, wherein
the preset trigger condition comprises:
an active trigger condition that is triggered by a user actively; and/or
a passive trigger condition that is triggered by a vehicle action.

9. A computer device, comprising a storage module, a processor, and a computer program stored on the storage module and executable on the processor, wherein the processor implements the vehicle positioning method for a fixed parking spot according to any one of claims 1 to 8 when executing the computer program.

\* \* \* \* \*